UNITED STATES PATENT OFFICE.

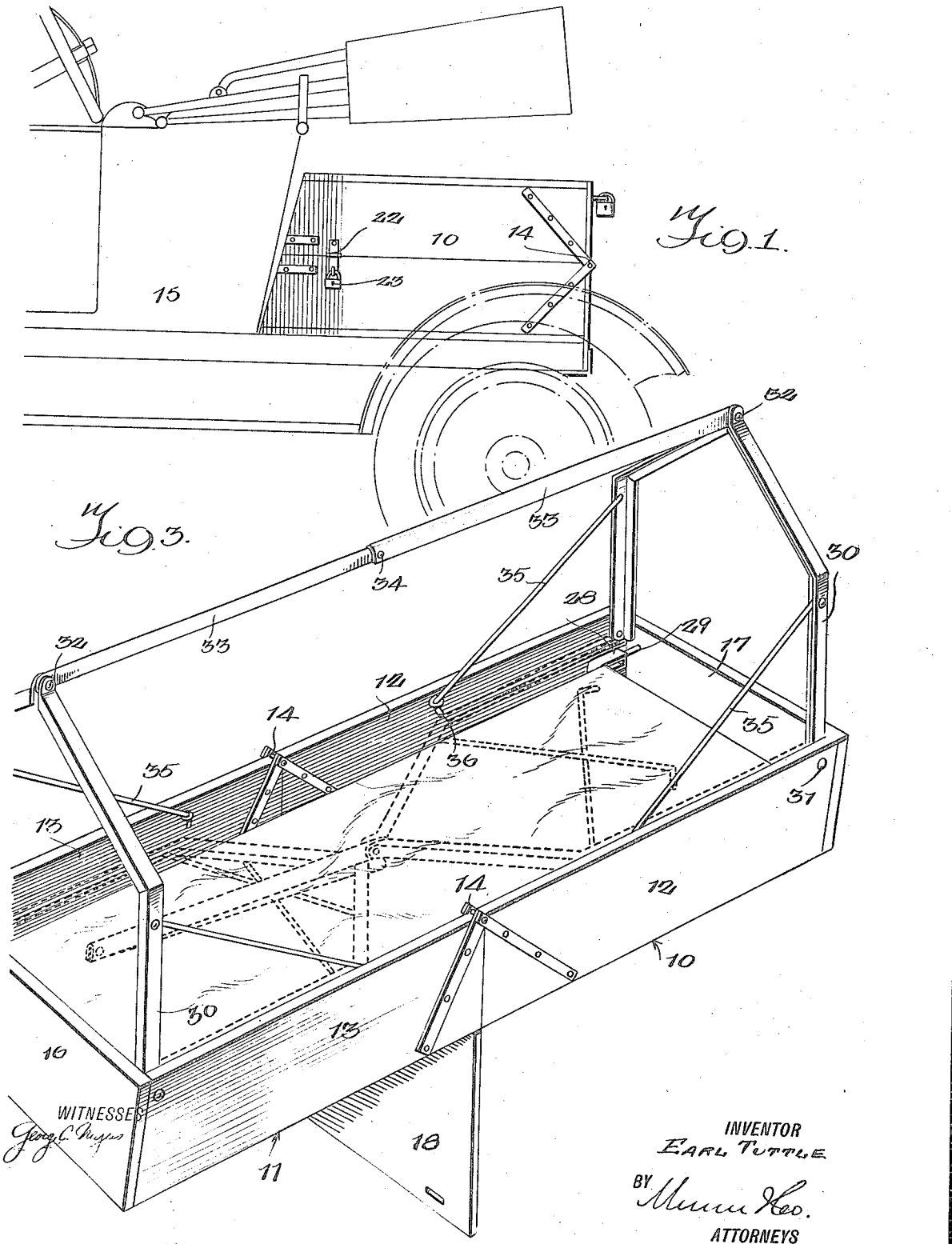

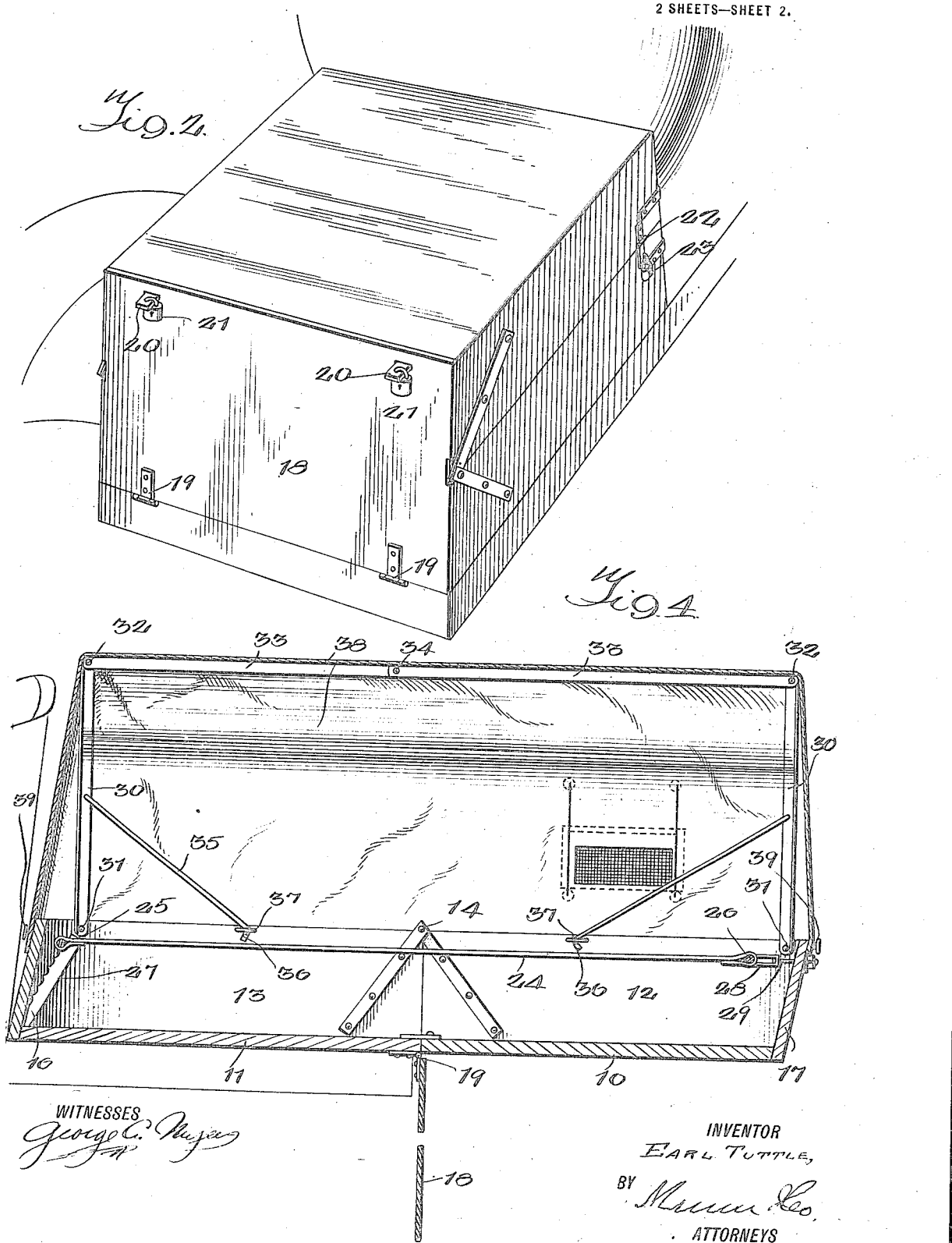

EARL TUTTLE, OF GRAND ISLAND, NEBRASKA.

FOLDING TENT BED FOR AUTOMOBILES.

1,424,222. Specification of Letters Patent. Patented Aug. 1, 1922.

Application filed November 10, 1921. Serial No. 514,230.

*To all whom it may concern:*

Be it known that I, EARL TUTTLE, a citizen of the United States, and a resident of Grand Island, in the county of Hall and State of Nebraska, have invented certain new and useful Improvements in Folding Tent Beds for Automobiles, of which the following is a specification.

My present invention relates generally to cots and the like and more particularly to a folding bed having provision for the use of a covering or canopy, my object being the provision of a simple compact structure capable of being carried as a regular part of the equipment of an automobile without adding bulk to its appearance and without inconvenience to the passengers or operator in the normal use of the vehicle.

In the accompanying drawings which illustrate my present invention and form a part of this specification, Figure 1 is a side view of the rear portion of an automobile showing the practical application of my invention in its folded normal position, Figure 2 is an enlarged perspective view thereof, Figure 3 is a perspective view of my improved folding tent bed in the open position with the canopy or cover removed, and Figure 4 is a longitudinal section showing the parts in the position of Figure 3 with the canopy or cover in place.

Referring now to these figures my invention proposes a tent bed in two longitudinally alined sections 10 and 11, these sections having the inner adjacent ends of their side rails 12 and 13 connected at their upper edges by hinges 14 which permit the outer movable section 10 to be moved on the hinges between the closed normal and inactive position of Figures 1 and 2 and the open active position of Figures 3 and 4. This construction also permits the section 11 to be secured firmly upon the rear portion of an automobile 15 as seen in Figures 1 and 2 for instance and by virtue of their side rails 12 and 13 and their end rails 16 and 17, the edges of which come into abutting relation when the section 10 is folded upon the section 11 it is obvious that the space within the two sections of the bed is closed when the sections are folded, except at the hinged ends of the sections and I provide a hinged vertically swinging gate 18 to close the folded bed at the hinged ends of the sections so that in the normal inactive position the entrance of dust, dirt and the like is in this way effectively prevented.

The closing gate 18 swings vertically on lower hinges 19 connected to the stationary section 11 as seen in Figure 4 and is provided with spaced slots to receive therethrough apertured lugs 20 projecting rearwardly from the hinged end of the movable section 10 when the sections are folded as seen in Figures 1 and 2, these apertured lugs being adapted in the closed position of the parts to receive padlocks and the like 21 which secure the closing gate 18 against accidental displacement as well as unwarranted tampering. The sections 10 and 11 may also be connected in the closed position by a shackle 22 and padlock 23 at one or both sides adjacent to their forward or outer ends.

Within the sections a continuous web 24 of flexible material forms the supporting surface for the sleeper, this web being flexible so that the sections 10 and 11 may be folded and having its ends secured to cross rails 25 and 26, the former adjustably supported at its opposite ends in notched side cleats 27 within the side rails 12 of section 11, and the latter having its opposite ends engaged by swivel members 28 receiving bolts 29 adjustable through the end rail 17 of section 10 so that the tension of the web 24 may be readily regulated.

Each of the sections 10 and 11 is moreover provided adjacent its outer end with an inverted U-shaped canopy support 30 whose lower ends are pivotally connected to the side rails of the section as at 31 and whose upper central portion is pivotally connected as at 32 to the outer end of one section 33 of an upper lengthwise supporting rail. The sections of this supporting rail are pivotally connected at their inner ends as at 34 in overlapping relation so that at its joint 34 they can only yield in an upward direction.

Each of the inverted U-shaped supporting frames 30 has connected to its opposite sides brace rods 35, movable with respect thereto and provided at their free ends with hooks 36 engageable with eyes 37 of the side rails of their respective section of the bed, the braces 35 serving to hold the frames in upright position with the ridge piece or supporting rail extending between their upper ends for the support of a flexible canopy or bed covering seen at 38 in Figure 4 whose lower surrounding edge may be detachably connected to buttons 39 on the side and end rails of the sections 10 and 11.

When the bed is to be folded after use in the position shown in Figures 3 and 4, the braces 35 are first detached at their hook ends 36 from the supporting eyes 37 of the side rails and the pivot joint 34 is then broken in an upward direction in order to permit the end frames 30 to be swung inwardly and downwardly. The two sections 33 of the supporting rail or ridge piece are so proportioned that when the frames 30 are swung inwardly and downwardly toward the supporting web 24, the two folded sections 33 may swing together on their pivots 32 to the position shown in dotted lines in Figure 3. The canopy or covering 38 having been previously detached from the buttons 39 may be folded and stored within the sections either above or below the supporting web 24 and the section 10 is then swung on the hinges 14 and folded upon the section 11 and then locked in the closed position as seen in Figures 1 and 2 and as previously described. The closing gate 18 is then swung upwardly to the position shown clearly in Figure 2 and this also locked, the whole bed in its folded position then closely approximating the appearance of the rear body extension of an automobile of the roadster type as will be seen by reference to Figure 1.

I claim:

1. A folding bed of the character described including hinged sections having side and end walls, and a flexible supporting web within the sections, having cross rails at its opposite ends, members at the ends of the side walls of one of the sections for detachably engaging and supporting the opposite ends of one of the cross rails, and adjustable web tensioning connections engaging the ends of the other cross rail and extending through the end wall of the adjacent bed section.

2. A folding tent bed for automobiles, including hinged sections, each having side and end walls, a flexible supporting web within the sections having transverse rails at its opposite ends, inclined supporting members secured to the inner surfaces of the side walls of one section and having series of recesses to adjustably and detachably receive the ends of one of said cross rails, and means adjustable through the end wall of the other section to hold the other end rail.

EARL TUTTLE.